(12) United States Patent
Vernick (10) Patent No.: US 9,672,549 B2
(45) Date of Patent: *Jun. 6, 2017

(54) SYSTEM AND METHOD FOR PROVIDING CUSTOMER SERVICE HELP

(71) Applicant: Avaya Inc., Santa Clara, CA (US)

(72) Inventor: Michael Vernick, Ocean, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,692

(22) Filed: Feb. 8, 2016

(65) Prior Publication Data

US 2016/0155172 A1    Jun. 2, 2016

Related U.S. Application Data

(63) Continuation of application No. 14/154,951, filed on Jan. 14, 2014, now Pat. No. 9,256,893.

(51) Int. Cl.
| | |
|---|---|
| *H04M 3/42* | (2006.01) |
| *H04W 24/00* | (2009.01) |
| *G06Q 30/06* | (2012.01) |
| *G06Q 30/02* | (2012.01) |
| *H04L 29/08* | (2006.01) |
| *H04W 4/16* | (2009.01) |
| *H04W 4/00* | (2009.01) |

(52) U.S. Cl.
CPC ..... *G06Q 30/0613* (2013.01); *G06Q 30/0281* (2013.01); *H04L 67/025* (2013.01); *H04L 67/04* (2013.01); *H04L 67/10* (2013.01); *H04L 67/18* (2013.01); *H04W 4/008* (2013.01); *H04W 4/16* (2013.01)

(58) Field of Classification Search
None
See application file for complete search history.

(56) References Cited

U.S. PATENT DOCUMENTS

| | | | |
|---|---|---|---|
| 9,256,893 B2 * | 2/2016 | Vernick | G06Q 30/0281 |
| 2012/0158597 A1 * | 6/2012 | Malik | G06Q 30/016 |
| | | | 705/304 |

* cited by examiner

*Primary Examiner* — Erika Washington
(74) *Attorney, Agent, or Firm* — Sheridan Ross P.C.

(57) ABSTRACT

Systems, methods, and computer-readable storage media for providing customer service help. The system first receives, from a user device, contact information associated with the user device, wherein the contact information is received via a customer service terminal having a user interface configured to wirelessly receive data from the user device when the user device is within a distance of the customer service terminal. In response to receiving the contact information, the system then identifies a customer service representative associated with the customer service terminal. The system then sends the contact information to a remote device associated with the customer service representative. The customer service representative can then initiate a customer service communication between the user device and the remote device in order to provide customer service help to the user associated with the user device.

20 Claims, 4 Drawing Sheets

SYSTEM AND METHOD FOR PROVIDING CUSTOMER SERVICE HELP

The present application is a continuation of U.S. patent application Ser. No. 14/154,951 filed Jan. 4, 2014, now U.S. Pat. No. 9,256,893, entitled "SYSTEM AND METHOD FOR PROVIDING CUSTOMER SERVICE HELP", which is incorporated herein by this reference in its entirety.

BACKGROUND

1. Technical Field

The present disclosure relates to customer service terminals, and more specifically to customer service terminals for directing customer service representatives to a user's mobile device.

2. Introduction

Self-service kiosks are often provided in retail service establishments to allow customers to quickly and easily obtain service, and to facilitate customer transactions. Kiosks may be used to provide users with information relating to product or service availability. For example, kiosks can provide information relating to products available for in-store purchase in a retail setting, available seating or flight information in an airport, or location and contact information for users seeking directory information, such as directions to business (e.g., hotels) and phone numbers in user directories. Kiosks can additionally be used at retail establishments to allow customers to check the price of a product. For example, a retail establishment may provide kiosks that allow users to scan a product to view the product's price.

Self-service kiosks can also provide users with ways to contact a service representative for help. For example, self-service kiosks can allow a customer to initiate a customer service call from the self-service kiosk. Alternatively, self-service kiosks can direct customers to a web-based setting where the customer can navigate through web-based content relating to the desired customer service inquiry. However, the current self-service kiosks and implementations require customers to remain at the self-service kiosk and even enter, manually, detailed information about the customer and the service inquiry in order to conduct a customer service transaction. Yet this process can be inefficient and undesirable for the customer.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches disclosed herein can be used to implement a call-back system to provide customer service to users. The call-back system allows users to quickly and easily obtain customer service right from their mobile phone. This way, the user can receive customer service while freely moving around, if desired, and without having to remain at a specific location. When a user needs customer service, he or she can simply take his or her mobile phone to a nearby customer service terminal, and the customer service terminal can automatically receive or retrieve the user's mobile phone number from the mobile phone, and provide the phone number to an agent to allow the agent to contact the user at the user's mobile phone. The customer service terminal can receive or retrieve the user's phone number from the mobile phone when the mobile phone is within a range of the customer service terminal. Thus, to initiate a customer service transaction, the user is not required to enter his or her phone number, navigate a form, or enter detailed information, as the customer service terminal can automatically receive or retrieve the user's phone number from the mobile phone, and instruct an agent to call the user's mobile phone to provide customer service to the user.

For example, if a user has a question about a wrench in a store's tools aisle, he or she can walk towards a customer service terminal located in the tools aisle, and have the customer service terminal automatically receive or retrieve the user's mobile phone number from the user's mobile phone. The customer service terminal can then provide the user's mobile phone number to an agent, which can then call the user at the user's mobile phone number to establish a customer service transaction with the user.

When the agent receives the user's mobile phone number from the customer service terminal, he or she can also infer the user's location based on the customer service terminal's location, as the agent knows that the user's mobile phone is within a range of the customer service terminal. Knowing the user's location, the agent may also be able to infer the user's customer service context. For example, if an agent in a retail environment receives a user's mobile phone number from a customer service terminal located in the tools aisle, the agent may be able to infer that the user's service inquiry is related to tools. The inferred context information can include a topic, a product, a question, a status, a degree of urgency, an intent, a setting, a circumstance, a subject, a question complexity, an expectation, an activity, etc. This information can help direct the user's customer service inquiry to the proper agent, and provide the agent with background and/or relevant information regarding the user's customer service inquiry.

Disclosed are systems, methods, and non-transitory computer-readable storage media for providing customer service help to users. The system first receives, from a user device, contact information associated with the user device. The system can be, for example, a terminal, an endcap, a wireless device, a computer, a kiosk, etc. The system can receive the contact information wirelessly from the user device. Moreover, the system can receive the contact information via an interface configured to wirelessly receive data from the user device when the user device is within a distance of the system. The interface can be, for example, a near field communication (NFC) interface, a Bluetooth interface, a radio interface, etc. In some embodiments, the system can detect the user device when the user device is within a wireless range and automatically retrieve and/or receive the contact information from the user device. In other embodiments, the system can include a camera for scanning information, including contact information, from the user device. For example, the system can use the camera to scan a machine-readable code, such as a quick response (QR) code, from the user device. The machine-readable code can be scanned to extract contact information, product information, and/or any additional information.

The user device can be any mobile device, such as a mobile phone, a tablet computer, a laptop, etc. The contact information can be a phone number, an email address, an instant messaging address, a subscriber identity, a username, an ICC ID, a Bluetooth address, a Wi-Fi address, a network address, a media access control, a session initiation protocol uniform resource identifier, and/or any other type of contact address, number, and/or identifier. The contact information can also include a name, an address, a title, a profile, a resource location, a network name, an identifier, an alias, a customer identifier, a product identifier, a serial number, etc. Moreover, the contact information can also include additional information, such as status information, location information, call-back information, inquiry information, context information, customer information, product information, carrier information, a date, a time, etc.

Next, in response to receiving the contact information, the system identifies a customer service representative associated with the system. The system identifies the customer service representative in order to determine which agent is to receive the contact information and/or provide support to the user associated with the user device. In some embodiments, the system is configured for, matched to, and/or associated with a specific customer service representative. Here, the system can simply identify which customer service representative it is associated with, or receive, from a server, an indication identifying a specific customer service representative, for example. In other embodiments, the system can identify a specific customer service representative from a group of customer service representatives. For example, the system can identify a specific customer service representative from various customer service representatives associated with the system. The system can select the specific customer service representative from the group based on a location associated with the system, the contact information, a time and/or date it received the contact information, a mapping of agents-to-terminals, the user device associated with the contact information, a product, a topic, etc. The system can also identify the customer service representative from the group based on one or more routing protocols, such as skills-based routing and dynamic routing, as well as other factors, such as agent availability, agent workload, agent status, queue management factors. In some cases, the specific customer service representative can select himself or herself from the group of customer service representatives, and send an indication to the system, identifying himself or herself as the customer service representative from the group that should receive the contact information and/or provide support to the user.

The system then sends the contact information to a remote device associated with the customer service representative. For example, the system can send the contact information to the customer service representative's computer, smartphone, etc. In some embodiments, the system can send the contact information to a central server. The central server can maintain, route, forward, and/or manage the contact information received from the system. The information sent to the remote device can include contact information of one or more types, such as a phone number or an email address, as previously described. The information sent to the remote device can also include additional information, such as a customer name, a customer profile, a resource location, a customer identifier, a product identifier, a serial number, location information, call-back information, inquiry information, context information, a date, a time, etc. The system can also send an indication to the remote device and/or a central server, with a notification that the user device should be contacted by the customer service representative—or any other agent—based on the contact information.

In some embodiments, the system can then establish a communication between the user device and the remote device (or another device associated with the customer service representative). For example, the system can use the contact information to establish a telephone call between the user device and the customer service representative's mobile phone. As another example, the system can establish an instant messaging session between the user device and the customer service representative's computer. In other embodiments, the customer service representative can receive the contact information, and initiate a communication with the user device via the remote device or any other device. For example, the customer service representative can receive the contact information (either from the system, a server, or another device) at the remote device, and use the contact information to call the user device. The customer service representative can call the user device from any device, such as a mobile phone, or the remote device itself. In still other embodiments, the system can send the contact information to a server, which then connects a device associated with the customer service representative with the user device to establish a communication, using the contact information received/retrieved from the user device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The terms agent and customer service representative are used interchangeably herein, and can include a software agent and/or a human agent. Moreover, the terms service and support are used interchangeably herein to mean any type of service, support, help, response, and/or communication provided to a user.

The present disclosure addresses the need for convenient and efficient customer service. A system, method and computer-readable media are disclosed which provide customer service to users at the user's mobile device. A brief introductory description of a basic general purpose system or computing device in FIG. 1, which can be employed to practice the concepts, is disclosed herein. A detailed description of configurations and embodiments for providing customer service will then follow. These variations shall be described herein as the various embodiments are set forth. The disclosure now turns to FIG. 1.

Figure 1:
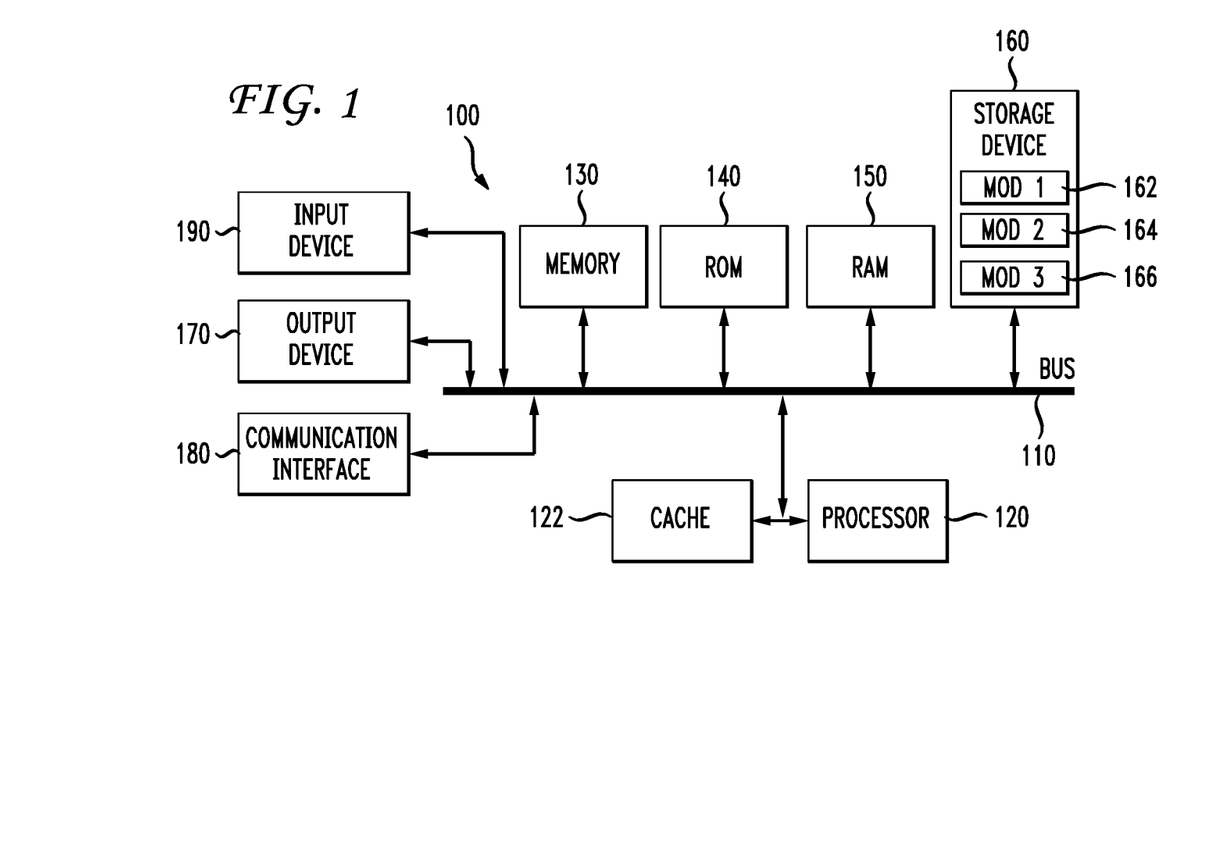
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
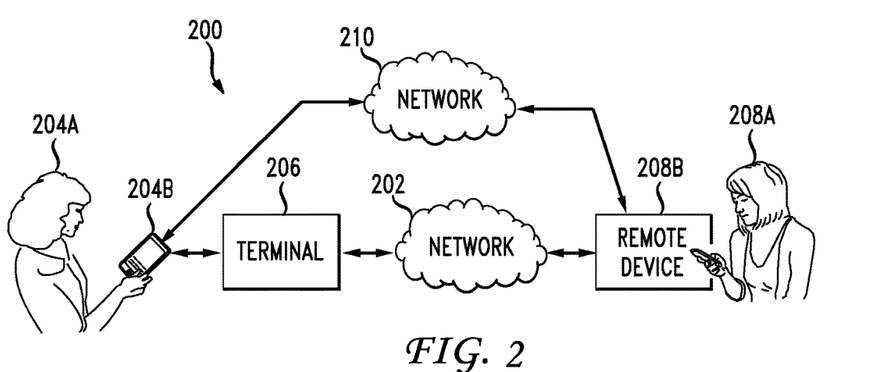
FIG. 2 illustrates an example configuration for providing service to a user.

Having disclosed some components of a computing system, the disclosure now turns to FIG. 2, which illustrates an example configuration 200 for providing service to a user. Here, agent 208A can provide service to user 204A via a communication between the user's mobile device 204B and the agent's device 208B. When user 204A needs to obtain service, he or she can take mobile device 204B within a range of terminal 206, to enable an exchange of contact information between the mobile device 204B and the terminal 206, as further detailed below. The terminal 206 can then transmit the contact information from the mobile device 204B to the remote device 208B, via network 202. The agent 208A can obtain the contact information from the remote device 208B, and use the contact information to contact the user 204A at the mobile device 204B, in order to provide service to the user 204A. The agent 208A can contact the user 204A via network 210. For example, the agent 208A can establish a telephone call with user 204A via network 210. In this example, network 210 can be a telephone network, such as a public switched telephone network. As another example, the agent 208A can establish a video call with user 204A via network 210. Here, the network 210 can be a packet switched network, for example. In some embodiments, the agent 208A can establish a communication with the user 204A via network 202 and/or network 210. Indeed, in some cases, network 202 and network 210 can be the same network. Moreover, the network 202 and/or the network 210 can include a public network, such as the Internet, but can also include a private or quasi-private network, such as an intranet, a home network, a virtual private network (VPN), a shared collaboration network between separate entities, etc. Indeed, the principles set forth herein can be applied to many types of networks, such as local area networks (LANs), virtual LANs (VLANs), corporate networks, wide area networks, and virtually any other form of network.

Furthermore, the agent 208A can infer the location of the mobile device 204B, based on the location of the terminal 206. This can also allow the agent 208A to infer additional details about the service requested/required by the user 204A. For example, if the terminal 206 is located within a particular department in an establishment, the agent 208A may infer that the user 204A has an inquiry about products and/or services associated with that specific department. The agent 208A can also infer additional details about the service inquiry and/or the context of the user 204A based on the current date, the current time, the identity of the terminal 206, the identity of the user 204A, etc. For example, the terminal 206 can be designated for a specific set of product and/or service inquiries. Accordingly, the agent 208A can infer that the inquiry is related to the set of product and/or service inquiries, based on the identity of the terminal 206, as the agent 208A knows that the terminal 206 is to be used for those specific product and/or service inquiries.

The terminal 206 can be a customer service terminal, an endcap, a kiosk, a computer, etc. In fact, the terminal 206 can be any device with networking capabilities. As previously mentioned, the terminal 206 can automatically receive or retrieve contact information, such as the phone number of the mobile device 204B, when the mobile device 204B is within a range. The range can depend on the configuration of the terminal 206. For example, the terminal 206 can be configured to receive/retrieve data from mobile devices using NFC. In this case, the range can be approximately 2 to 4 cm. With NFC, the close range communication between the mobile device 204B and the terminal 206 can take place via magnetic field induction. The terminal 206 can also be configured to retrieve data from mobile devices using a camera on the terminal 206 to scan the data on the mobile devices. Here, the range can depend on the capabilities of the camera. One of ordinary skill in the art will readily understand, after reading this disclosure, the possible ranges for scanning information from a camera. The terminal 206 can also be configured to receive or retrieve the data from mobile devices using any other wireless configurations, such as Wi-Fi or Bluetooth, for example. One of ordinary skill in the art will readily understand, after reading this disclosure, the possible ranges for receiving or retrieving data depending on the specific wireless configuration implemented.

The contact information exchanged between the mobile device 204B and the terminal 206 can be automatic and/or initiated by the user 204A. In some embodiments, the terminal 206 and the mobile device 204B can automatically connect to exchange information, including contact information, when both devices are within a wireless range. In other embodiments, the user 204A can initiate the communication between the mobile device 204B and the terminal 206. For example, the user 204A can initiate the communication by pressing a button, executing a command, and/or modifying a setting at the mobile device 204B and/or the terminal 206. As another example, the user 204A can initiate an exchange of data between the mobile device 204B and the terminal 206 by placing the mobile device 204B within a close distance of the terminal 206. By moving the mobile device 204B close to the terminal 206, the user 204A can initiate a transfer of data via a wireless standard, such as NFC.

In still other embodiments, the user 204A can move the mobile device 204B within a distance of a camera at the terminal 206, and initiate a scan of information at the mobile device 204B from the terminal 206. The camera at the terminal 206 can be used to scan data at the mobile device 204B, in order to transfer the contact information to the terminal 206. The camera can scan, for example, a computer-readable code at the mobile device 204B containing the contact information, such as a QR code. Once the camera scans the computer-readable code, the terminal 206 can analyze the code and extract the contact information and any other data, or forward the code to another device, such as a server, which can then extract the contact information and any other data from it. As previously mentioned, the distance between the mobile device 204B and the camera at the terminal 206 necessary to scan the data can depend on the capabilities and/or configuration of the camera.

Once the terminal 206 has obtained the contact information from the mobile device 204B, it can transmit the contact information (and any other information obtained from the mobile device 204B) to the remote device 208B via network 202, as previously explained. In some cases, the terminal 206 can also transmit the contact information to other devices for access by other agents. The remote device 208B can be any device with networking capabilities. In some embodiments, the remote device 208B can be a server. The server can maintain the contact information to allow the agent 208A, and any other agents, access the contact information to contact the mobile device 204B. The server can also forward the contact information to one or more agent devices (i.e, devices used by agents and/or devices running software agents). In some cases, the remote device 208B can be configured to establish a communication between the agent 208A and the user 204A via mobile device 204B and the remote device 208B and/or another device, based on the contact information. Here, the remote device 208B can receive the contact information from the terminal 206 and automatically establish a communication with the mobile device 206.

Figure 3:
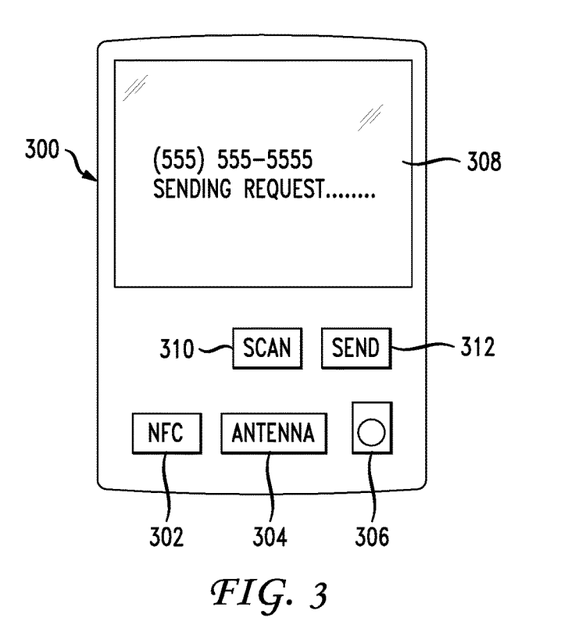
FIG. 3 illustrates an example customer service terminal.

FIG. 3 illustrates an example customer service terminal 300. The customer service terminal 300 can include an NFC interface 302 for exchanging information with other devices via NFC. The NFC interface 302 can allow for short-range communication at relatively low data rates, such as 424 kb/s, and may comply with standards such as ISO 18092 or ISO 21481. Short-range communications with the NFC interface 302 may occur via magnetic field induction with other devices equipped to communicate via NFC. In some cases, the short-range communications may have a range of approximately 2 to 4 cm. The customer service terminal 300 can also include an antenna 304 for wirelessly communicating with other devices. The antenna 304 can be, for example, a Bluetooth antenna and/or a network interface card (NIC), such as a NIC for communicating via a Wi-Fi and/or an Ethernet connection. The customer service terminal 300 can also include a camera 306. The camera 306 can be configured to scan data and/or codes stored on other devices, and/or capture images of the data and/or codes stored on the other devices.

The customer service terminal 300 can include a display 308, such as an LED display, for displaying relevant information. For example, the display 308 can display a status of the customer service terminal 300 and/or a connection; a mode of communication; a progress of a communication; a setting of a communication; an error; a prompt; a software button; an image; data captured, received, and/or retrieved by the customer service terminal 300; etc. Moreover, the display 308 can be a touch screen configured to allow users to provide input by touch. Further, the display 308 can include a graphical user interface to allow users to navigate settings and information, initiate tasks and commands, modify information and settings, input information, etc. The customer service terminal 300 can also include a scan button 310 to scan information from other devices, and/or a send button 312 to transmit information received, scanned, and/or retrieved from other devices. The send button 312 can be configured to transmit the information via the antenna 304 to a remote device, such as a server, for example. The scan button 310 and/or the send button 312 can be physical buttons or software buttons configured to execute a corresponding command. In some embodiments, the customer service terminal 300 can include additional buttons, such as navigation buttons, input buttons, control buttons, power buttons, etc. The customer service terminal 300 can also include speakers, input devices, a processor, a battery, a power supply, a memory, a storage device, a database, a light, a sensor, a card reader, a GPS antenna, a modem, an adapter, a switch, a microphone, and/or any other hardware component.

Figure 4:
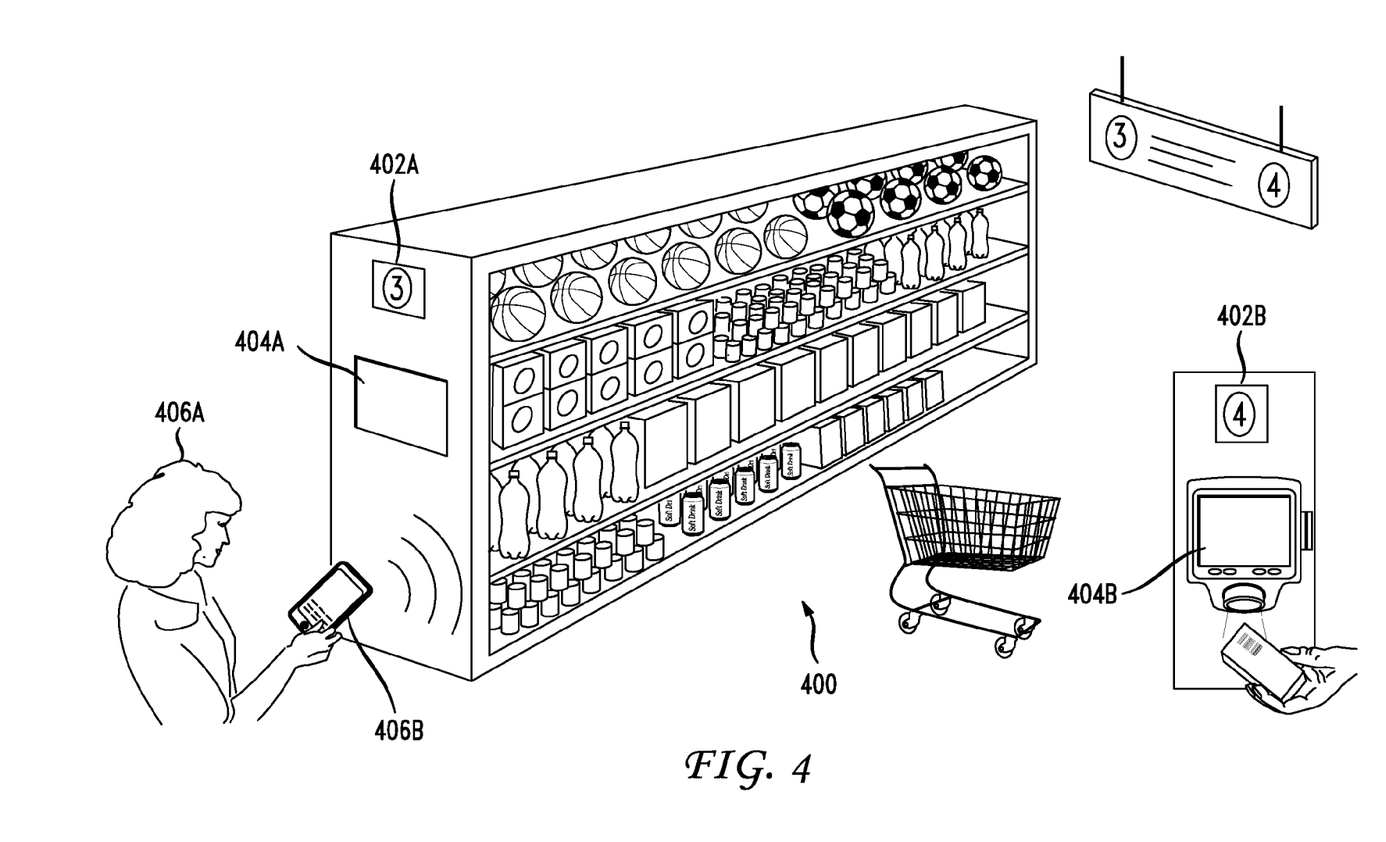
FIG. 4 illustrates an example environment for a service terminal.

FIG. 4 illustrates an example environment 400 for a service terminal. In this example, the environment 400 is a retail environment. However, as one of ordinary skill in the art will readily recognize after reading this disclosure, in other embodiments, the environment 400 can be any other type of environment where service or support can be provided to a user through a service terminal. For example, the environment can be an airport, a gas station, a parking garage, a warehouse, a municipality, a school, a factory, a business, a bus terminal, a building, a resort, a hospital, a train station, an apartment, an office, a park, a complex, etc.

The environment 400 includes aisles 402A-B with products, where user 406A can browse and shop for the specific products in the aisles 402A-B. The aisles 402A-B can include terminals 404A-B, where the user 406A can initiate a customer service transaction. The terminals 404A-B are located at the end of the aisles 402A-B. However, as one of ordinary skill in the art will readily recognize after reading this disclosure, the terminals 404A-B can be located anywhere else in or near the aisles 402A-B. For example, the terminals 404A-B can be placed next to specific products or categories of products within the aisles 402A-B. Moreover, the aisles 402A-B can include more or less terminals than illustrated in FIG. 4. For example, the aisles 402A-B can share a single terminal, or each of the aisles 402A-B can have multiple terminals. In some cases, an aisle can have multiple sections of products, and a terminal can be placed at each section within the aisle. Here, a terminal at a specific section of products can correspond to a specific product(s) in that specific section of products. Also, one or more agents can be assigned to respond to inquiries initiating at a specific terminal, for example.

The products in the aisles 402A-B can be selected and/or organized in a specific manner. In retail environments, products are typically sorted and/or organized by aisle, and each product is assigned to a specific aisle, at least for a specific period of time. This can help customers and agents identify, compare, and/or browse products in the retail environment. Products can be placed in specific aisles according to product categories, product brands, product prices, product dates, product similarities, product functionalities, product sales, product relationships, aesthetic appearance, etc. However, in some cases, one or more products can be randomly placed in, or selected for, specific aisles. The principles disclosed herein can be applied in environments having aisles with products arranged, organized, displayed, selected, and/or sorted in any way, including randomly.

In FIG. 4, if the user 406A wants to initiate a service inquiry/transaction, she can do so from one of the terminals 404A-B. For example, the user 406A can go to terminal 404A and place her mobile device 406B within a close range of the terminal 404A to allow the terminal 404A to receive/extract the phone number of the mobile device 406B, and provide the phone number to an agent who can call the user 406A at the mobile device 406B to establish a service transaction. This way, the user 406A can quickly obtain service from an agent, right from her mobile device 406B, without having to search from an agent, without having to lookup the agent's contact information, without having to call the agent, and without even having to manually input her contact information or fill a form. Thus, the process of obtaining the phone number of the user 406A and calling the user 406A at her mobile device 406B for service can be automated for efficiency and convenience. Given privacy concerns by the user 406A, the information from the user 406A and mobile device 406B is obtained with the consent, knowledge, and/or control of the user 406A.

In some cases, the terminal 404A can provide the contact information to a server to maintain the contact information at a centralized location. The server can then forward the contact information, or an alert/notification, to one or more agents. One or more agents can have access to the contact information. The server can select which agent receives the contact information and/or contacts the user 406A, or it can allow the agents themselves to control who receives the contact information and/or contacts the user 406A. The server can also establish a call between the mobile device 406B and an agent.

In some embodiments, the user 406A can initiate a service inquiry/transaction by scanning her mobile phone number from the terminal 404A. For example, the user 406A can scan an image, text, and/or machine-readable code (e.g., QR code) on the mobile device 406B via a camera/scanner on the terminal 404A. The terminal 404A can then extract the contact information from the scan and forward the contact information to a server and/or one or more agents. Alternatively, the terminal 404A can forward the scan to a server and/or one or more agents, and the server and/or agents can then extract the contact information from the scan. For example, the user can show an image, text, machine readable code on their mobile device display then hold up their mobile device to a scanner on the terminal which scans the image on the device to extract the contact information.

In some embodiments, the terminals 404A-B can display a machine-readable code, such as a QR code, which the user 406A can scan from the mobile device 406B to obtain service. When the user 406A scans the machine-readable code, the machine-readable code can direct a browser on the mobile device 406B to a web page for obtaining service. The web page can include a form that the user 406A can submit to a server as part of her service inquiry. In some cases, the web page can execute code to automatically extract the phone number of the mobile device 406B and forward the phone number to a server and/or one or more agents. Here, when the browser on the mobile device 406B requests the web page from the web page's server, the request can trigger the execution of the code to extract the phone number from the mobile device 406B. The code can be executed in the server side and/or on the local browser.

Figure 5:
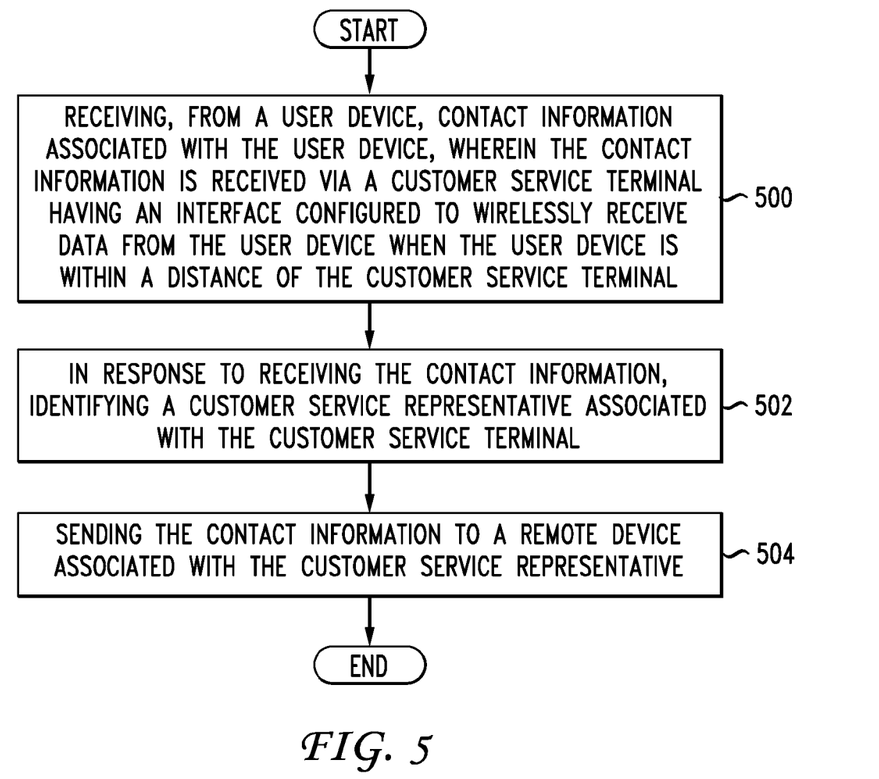
FIG. 5 illustrates an example method embodiment.

Having disclosed some basic system components and concepts, the disclosure now turns to the exemplary method embodiment shown in FIG. 5. For the sake of clarity, the method is described in terms of an exemplary system 100, as shown in FIG. 1, configured to practice the method. The steps outlined herein are exemplary and can be implemented in any combination thereof, including combinations that exclude, add, or modify certain steps.

The system 100 first receives, from a user device, contact information associated with the user device (500). The system 100 can receive the contact information wirelessly from the user device. Moreover, the system 100 can receive the contact information via an interface configured to wirelessly receive data from the user device when the user device is within a distance of the system 100. The interface can be, for example, an NFC interface, a Bluetooth interface, a radio interface, etc. In some embodiments, the system 100 can detect the user device when the user device is within a wireless range and automatically retrieve and/or receive the contact information from the user device. In other embodiments, the system 100 can include a camera for scanning information, including contact information, from the user device. For example, the system 100 can use the camera to scan a machine-readable code, such as a QR code, from the user device. The machine-readable code can be scanned to extract contact information, product information, and/or any additional information. In some embodiments, the user's device can scan a code on the terminal as previously described in paragraph above.

The user device can be any mobile device, such as a mobile phone, a tablet computer, a laptop, smart glasses, etc. The contact information can be a phone number, an email address, an instant messaging address, a subscriber identity, a username, an ICC ID, a Bluetooth address, a Wi-Fi address, a network address, a media access control, a session initiation protocol uniform resource identifier, and/or any other type of contact address, number, and/or identifier. The contact information can also include a name, an address, a title, a profile, a resource location, a network name, an identifier, an alias, a customer identifier, a product identifier, a serial number, etc. Moreover, the contact information can also include additional information, such as status information, location information, call-back information, inquiry information, context information, customer information, product information, carrier information, a date, a time, etc.

Next, in response to receiving the contact information, the system 100 identifies a customer service representative associated with the system 100 (502). The system 100 identifies the customer service representative in order to determine which agent is to receive the contact information and/or provide support to the user associated with the user device. In some embodiments, the system 100 is configured for, matched to, and/or associated with a specific customer service representative. Here, the system 100 can simply identify which customer service representative it is associated with, or receive, from a server, an indication identifying a specific customer service representative, for example. In other embodiments, the system 100 can identify a specific customer service representative from a group of customer service representatives. For example, the system 100 can identify a specific customer service representative from various customer service representatives associated with the system 100. The system 100 can select the specific customer service representative from the group based on a location associated with the system 100, the contact information, a time and/or date it received the contact information, a mapping of agents-to-terminals, the user device associated with the contact information, a product, a topic, etc. The system 100 can also identify the customer service representative from the group based on one or more routing protocols, such as skills-based routing and dynamic routing, as well as other factors, such as agent availability, agent workload, agent status, queue management factors. In some cases, the specific customer service representative can select himself or herself from the group of customer service representatives, and send an indication to the system 100, identifying himself or herself as the customer service representative from the group that should receive the contact information and/or provide support to the user.

The system 100 then sends the contact information to a remote device associated with the customer service representative (504). For example, the system 100 can send the contact information to the customer service representative's computer, smartphone, etc. In some embodiments, the system 100 can send the contact information to a central server. The central server can maintain, route, forward, and/or manage the contact information received from the system 100. The information sent to the remote device can include contact information of one or more types, such as a phone number or an email address, as previously described. The information sent to the remote device can also include additional information, such as a customer name, a customer profile, a resource location, a customer identifier, a product identifier, a serial number, location information, call-back information, inquiry information, context information, a date, a time, etc. The system 100 can also send an indication to the remote device and/or a central server, with a notification that the user device should be contacted by the customer service representative—or any other agent—based on the contact information.

In some embodiments, the system 100 can then establish a communication between the user device and the remote device (or another device associated with the customer service representative). For example, the system 100 can use the contact information to establish a telephone call between the user device and the customer service representative's mobile phone. As another example, the system 100 can establish an instant messaging session between the user device and the customer service representative's computer.

In other embodiments, the customer service representative can receive the contact information, and initiate a communication with the user device via the remote device or any other device. For example, the customer service representative can receive the contact information (either from the system 100, a server, or another device) at the remote device, and use the contact information to call the user device. The customer service representative can call the user device from any device, such as a mobile phone, or the remote device itself. In still other embodiments, the system 100 can send the contact information to a server, which then connects a device associated with the customer service representative with the user device to establish a communication, using the contact information received/retrieved from the user device.

When an agent receives the user's mobile phone number from the system 100, he or she can also infer the user's location based on the system's location, as the agent knows that the user's mobile phone is within a range of the system 100. Knowing the user's location, the agent may also be able to infer the user's customer service context. For example, if an agent in a retail environment receives a user's mobile phone number from a customer service terminal located in the tools aisle, the agent may be able to infer that the user's service inquiry is related to tools. The inferred context information can include a topic, a product, a question, a status, a degree of urgency, an intent, a setting, a circumstance, a subject, a question complexity, an expectation, an activity, etc. This information can help direct the user's customer service inquiry to the proper agent, and provide the agent with background and/or relevant information regarding the user's customer service inquiry.

The service transaction between the customer service representative and the user will typically include a telephone call (e.g., an IP telephony call and/or analog call connected through one or more IP phone, analog phone, and/or cellular or other wireless telephone networks). However, the customer service representative can also communicate with the user through other messaging protocols, such as instant messaging, text messaging, electronic mail messaging (e-mail), etc.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

I claim:

1. A method comprising:
   monitoring, by a user device, a distance between the user device and a stationary customer service terminal, wherein the stationary customer service terminal is one of an endcap or a kiosk associated with a product or services aisle;
   when the distance between the user device and the stationary customer service terminal is within a predetermined distance, transmitting, via a wireless point-to-point connection from the user device to the stationary customer service terminal, contact information associated with the user device;
   receiving, by the user device, a request from an agent terminal identified by the stationary customer service terminal to establish a communication; and
   in response to the request, establishing, by the user device, the communication with the agent terminal.

2. The method of claim 1, wherein the stationary customer service terminal is located within a retail environment.

3. The method of claim 1, wherein the user device comprises at least one of a mobile phone, a tablet computer, a laptop, or smart glasses.

4. The method of claim 1, wherein the contact information comprises at least one of a telephone number, an email address, an instant messaging address, a subscriber identity, a username, an integrated circuit card identifier, a Bluetooth address, a Wi-Fi address, a network address, a media access control, or a session initiation protocol uniform resource identifier.

5. The method of claim 1, wherein the wireless point-to-point connection is based on at least one of a near-field communication, a Wi-Fi communication, or Bluetooth communication.

6. The method of claim 1, wherein the contact information is transmitted automatically from the user device to the stationary customer service terminal without a user interacting with the user device.

7. The method of claim 1, wherein transmitting the contact information is initiated by a user of the user device.

8. The method of claim 1, wherein the predetermined distance is a service range of the stationary customer service terminal.

9. The method of claim 1, further comprising:
scanning at least one of an image, a text, or a machine-readable code displayed on the user device via one of a camera or a scanner on the stationary customer service terminal.

10. The method of claim 1, wherein the communication with the agent terminal is a service agent interaction.

11. The method of claim 1, wherein the one of the endcap or kiosk comprises a plurality of endcaps or a plurality of kiosks associated with a respective product or services aisle, wherein the agent terminal comprises a plurality of agent terminals, and wherein individual ones of the plurality of agent terminals are identified differently based a respective one of the plurality of endcaps or a respective one of the plurality of kiosks.

12. A user device comprising:
a processor; and
a computer-readable storage medium storing instructions which, when executed by the processor, cause the processor to perform operations comprising:
monitoring a distance between the user device and a stationary customer service terminal, wherein the stationary customer service terminal is one of an endcap or a kiosk associated with a product or services aisle;
when the distance between the user device and the stationary customer service terminal is within a predetermined distance, transmitting, via a wireless point-to-point connection to the stationary customer service terminal, contact information associated with the user device;
receiving a request from an agent terminal identified by the stationary customer service terminal to establish a communication; and
in response to the request, establishing the communication with the agent terminal.

13. The user device of claim 12, wherein the stationary customer service terminal is located within a retail environment.

14. The user device of claim 12, wherein the user device comprises at least one of a mobile phone, a tablet computer, a laptop, or smart glasses.

15. The user device of claim 12, wherein the contact information comprises at least one of a telephone number, an email address, an instant messaging address, a subscriber identity, a username, an integrated circuit card identifier, a Bluetooth address, a Wi-Fi address, a network address, a media access control, or a session initiation protocol uniform resource identifier.

16. A computer-readable storage device storing instructions which, when executed by a processor, cause the processor to perform operations comprising:
monitoring, by the processor, a distance between a user device and a stationary customer service terminal, wherein the stationary customer service terminal is one of an endcap or a kiosk associated with a product or services aisle;
when the distance between the user device and the stationary customer service terminal is within a predetermined distance, transmitting, via a wireless point-to-point connection from the user device to the stationary customer service terminal, contact information associated with the user device;
receiving, by the processor, a request from an agent terminal identified by the stationary customer service terminal to establish a communication; and
in response to the request, establishing, by the processor, the communication with the agent terminal.

17. The computer-readable storage device of claim 16, wherein the wireless point-to-point connection is based on at least one of a near-field communication, a Wi-Fi communication, or a Bluetooth communication.

18. The computer-readable storage device of claim 16, wherein the contact information is transmitted automatically from the user device to the stationary customer service terminal without a user interacting with the user device.

19. The computer-readable storage device of claim 16, wherein transmitting the contact information is initiated by a user of the user device.

20. The computer-readable storage device of claim 16, storing additional instructions which, when executed by the processor, cause the processor to perform further operations comprising:
scanning at least one of an image, a text, or a machine-readable code displayed on the user device via one of a camera or a scanner on the stationary customer service terminal.

* * * * *